ABSTRACT

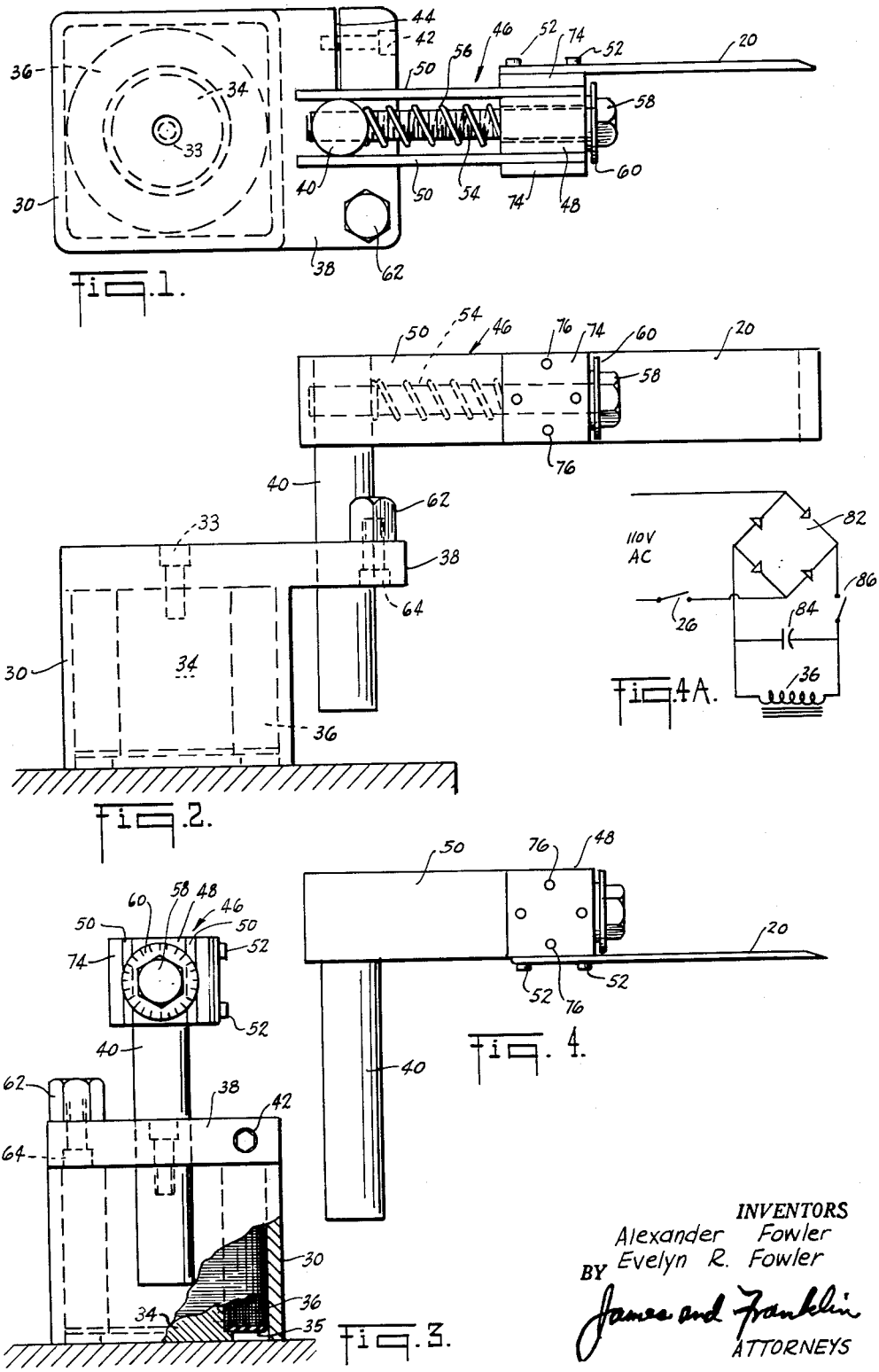

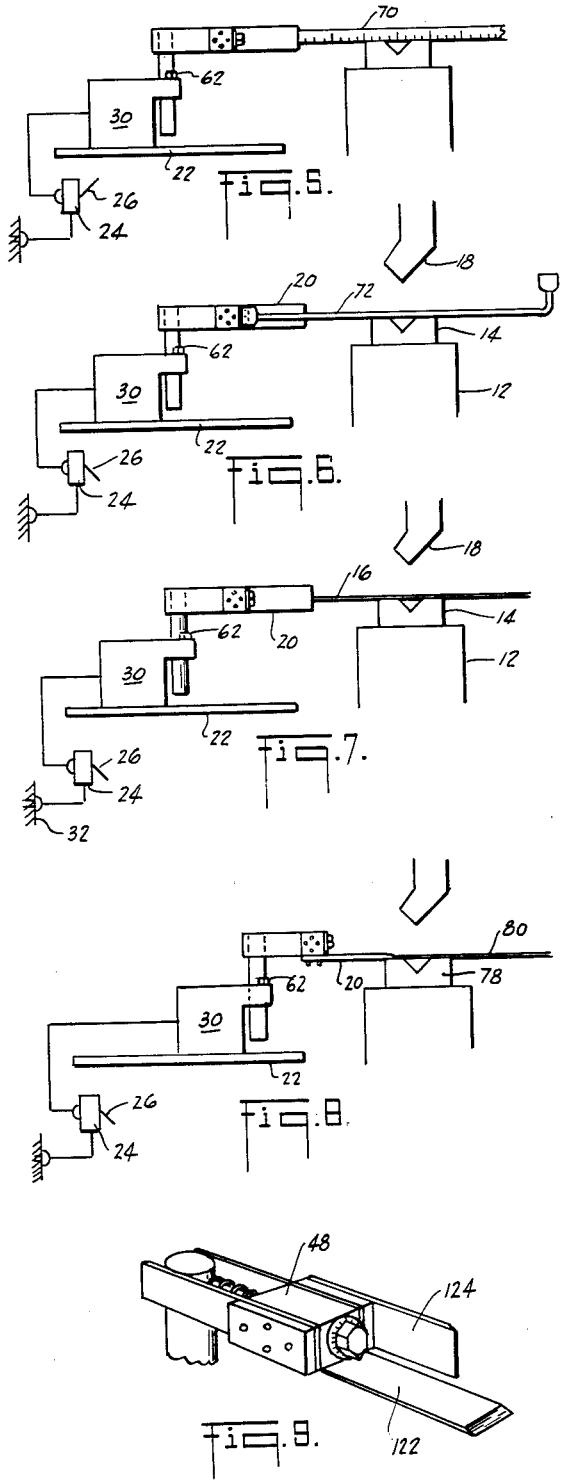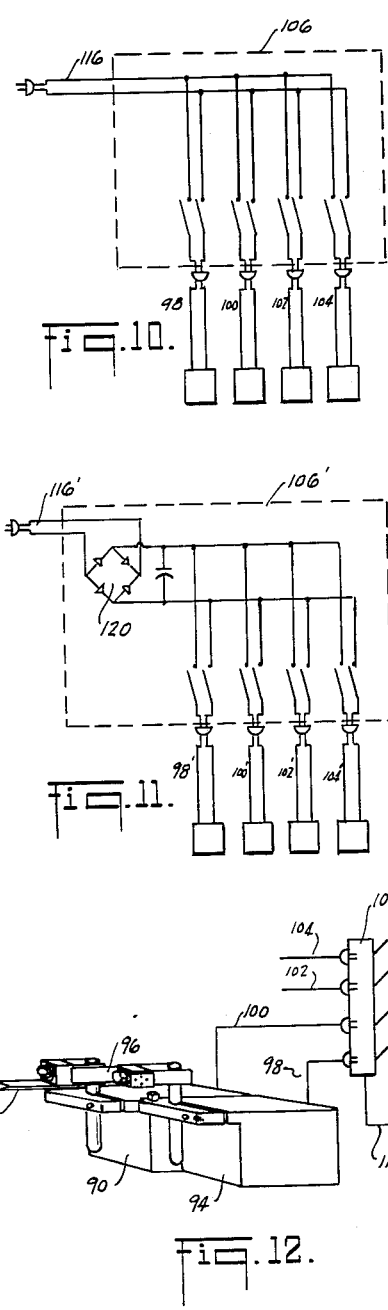

3,262,695
GAUGING DEVICE FOR POWER PRESS
Alexander Fowler and Evelyn R. Fowler, both of 334 Westover Road, Stamford, Conn.
Filed May 3, 1960, Ser. No. 26,456
22 Claims. (Cl. 269—317)

This invention relates to power presses, especially for working on sheet metal, and relates more particularly to a quickly releasable and movable gauge for use with such presses.

Power presses, including press brakes, shears, and other such metal working machines, commonly employ gauges against which the metal stock is moved to place it properly relative to the die. Adjustment of these gauges is time-consuming, and the mounting mechanism is complex because the gauges must be extensively movable from said to side to handle narrow or wide work; and vertically because of change in die height or because of bending of the work; as well as the main adjustment forward or rearward. All of these adjustments require clamps, or screw adjusting means with appropriate locks, etc. In operation the repeated impact of the work against the gauges tends to loosen their securing means, with a consequent loss of accuracy.

The primary object of the present invention is to generally improve such gauge systems. A more specific object is to provide a gauge which is instantaneously releasable, and which is quickly set to desired position from side to side as well as from front to back, and over large as well as small changes in position. A further object is to provide such a system in which the gauge position is maintained securely over an indefinite time.

Another object is to provide for vernier adjustment after the initial quick setting, and to provide a conveniently usable scale showing thousandths of an inch. Still another object is to provide means for cushioning the stop finger of the gauge, thereby protecting it against impact, and further serving to take up any play or lost motion in the vernier screw adjustment. A still further object is to provide for either vertical or horizontal mounting of a stop finger.

To accomplish the foregoing objects, and other more specific objects which will hereinafter appear, our invention resides in the gauge system, and the elements thereof, and their relation one to another, as are hereinafter more particularly described in the following specification. The specification is accompanied by drawings in which:

FIG. 1 is a plan view of a gauge embodying features of my invention;
FIG. 2 is a side elevation;
FIG. 3 is a front elevation;
FIG. 4 shows how the stop finger may be mounted horizontally instead of vertically;
FIG. 4a is a schematic wiring diagram for the electrical part of the gauge;
FIGS. 5 and 6 show successive steps in setting up the gauge;
FIG. 7 shows the gauge in use;
FIG. 8 shows the gauge in use with a horizontal instead of a vertical stop finger;
FIG. 9 is a perspective view showing both vertical and horizontal stop fingers on a single gauge;
FIG. 10 is explanatory of one method of connecting multiple gauges, with each gauge having its own rectifier;

FIG. 11 shows another method of connecting multiple gauges, with a common rectifier for all; and
FIG. 12 is a perspective view showing two of the four gauges as used for a two-step process.

Referring to the drawing, and more particularly to FIG. 7, the bed of a press is shown at 12, and this carries a lower die 14. Sheet metal 16 rests on lower die 14 and is operated on by an upper die 18. This is carried beneath the movable platen of the press which, for simplicity, is not shown in the drawing. The particular die here shown bends the sheet 16, and the location of the bend is determined by first moving the sheet up to spaced stops, one of which is indicated at 20.

In accordance with the present invention the gauge system includes a flat ferrous plate or table 22 disposed horizontally in back of the press. This is for a back gauge, it being understood that a similar plate and gauges may be located on the front side of the press when a front gauge is needed, but the back location is more common and will be assumed in the present description. The system includes an electrical switch at 24 operated by a switch handle 26, and rectifier means which may be located either at 24 or in the body 30 of the gauge.

Each gauge comprises a body 30 which houses an electromagnet powerful enough to hold the gauge against movement when electrically energized. It is energized from an ordinary A.C. supply, here indicated by a wall outlet at 32. By simply opening the switch 26 the electromagnet is de-energized, and the gauge body 30 may be freely moved anywhere over the surface of the ferrous plate 22. When switch 26 again is closed the gauge is instantly locked against movement.

Considering the arrangement in greater detail, and referring now to FIGS. 1, 2 and 3 of the drawings, the body 30 is preferably ferrous, and houses an electromagnet the core of which is indicated at 34, and the windings at 36. The body 30 includes a forwardly projecting overhung portion 38, and this carries a vertically adjustable post 40. The height of post 40 may be set and locked by means of a cap screw 42 which passes horizontally through a slot 44 leading to the hole in which post 40 is received. Core 34 is held by screw 33, and is enlarged at its lower end, to hold a non-ferrous washer 35 (FIG. 3) and coil 36 in position.

The post 40 carries a horizontally adjustable yoke generally designated 46. This comprises a block 48 and side guides 50 which closely straddle the post 40. The side guides are preferably spring metal, and are bent somewhat toward one another to tightly straddle the post. The stop finger 20 is secured to the block 48, as by means of screws 52. An adjusting screw 54 passes freely through the block 48 between the guides 50, and is threaded in the post 40. A compression spring 56 is disposed around the screw 54 between the post 40 and the block 48. The head 58 of the screw preferably is formed with a dial 60, calibrated for vernier adjustment of the screw. Because the screw passes freely through the block 48 the stop finger is resiliently yieldable on impact, but restores itself to its outermost position against the head of the screw. The magnetism and the pressure of the relatively stiff spring serve to maintain the adjustment of the screw, which therefore requires no additional locking means after it has been adjusted.

A projection 62, preferably shaped like the hexagonal head of a bolt, is secured to the gauge body, as by means of a screw 64. This head is preferably dimensioned like the head 58 of the vernier adjusting screw, so that the same socket wrench may be used for preliminary rough adjustment or sliding of the gauge on the plate, and the subsequent fine adjustment of the vernier screw. The wrench is preferably long, with a socket at each end, one at right angles to the other.

The screw and dial are preferably appropriately related for convenient adjustment. The dial is shown at 60 in FIG. 3. In the present case the screw has 20 threads per inch, and the dial has 50 divisions around its periphery, so that each division corresponds to one thousandth of an inch.

The method of setting up the gauge may be explained with reference to FIGS. 5, 6 and 7 of the drawing. The plate 22 is permanently fixed in position, and in effect becomes a part of the press. It is preferably a flat steel plate which is at least ⅜ of an inch thick, and it may be thicker. It may also be a cast bed, and it could be made an integral part of the bed or frame of the press. It is located somewhat lower than the die 14, so that the stop finger 20 may be located at the height of the die.

With the power shut off at switch 26, the gauge body 30 is freely movable over the plate 22. A suitable scale or ruler 70 is employed while moving the gauge to a desired position relative to the die. Ordinarily two gauges are employed, and the side-to-side spacing of these gauges will depend on the width of the material being used. When one gauge has been located its switch is closed, thereby fixing it in position. The second gauge is then located and its switch is closed.

For additional fine or vernier adjustment of the position of the stop finger 20, a long socket wrench 72 may be employed as shown in FIG. 6. This is passed through the open die to the gauge, and there is no danger to the hands of the operator. Frequently this final adjustment is made only after bending one or more test sheets in the press, that is, by "trial and error," and it is a great convenience to be able to make this fine adjustment quickly and safely through the die, as shown in FIG. 6.

The socket wrench also may be used for the initial rough adjustment of the gauge, and for this purpose the other end of the wrench is used. This has a socket in 90° position, and is slipped over the projection 62. With this arrangement the gauge may be pulled, pushed, moved sideward, or turned, all under control of the wrench, and without danger to the operator who may handle the wrench from the front of the press.

As so far described the stop finger 20 has been shown in edgewise or vertical position. This is the preferred position when the stop is located beyond the die, as shown in FIGS. 5, 6 and 7. However, when the stop is located over the die it is preferably used in horizontal or flat position, and this is illustrated in FIG. 4, in which the stop finger 20 has been secured to the bottom instead of the side of the block 48. The same screws 52 may be used, and the block is provided with threaded holes on the sides and the top and the bottom.

In FIGS. 1 and 3 it will be seen that block 48 is supplemented by side pieces 74 disposed outside the side guides 50 of the yoke. The parts 48, 50 and 74 are all permanently secured together by rivets or like fastening means, located at 76 (FIG. 2) above and below the adjusting screw 54. This mounting is independent of the screws 52 which secure the finger 20 to the block. The side blocks 74 afford ample clearance around the dial 60, as well as strengthen the yoke assembly.

Referring now to FIG. 8 the stop finger 20 is shown in horizontal position, and it rests directly on the top surface of the die 78. This is a situation in which the sheet 80 is to be bent on a line close to its leading edge, and the finger 20 is disposed horizontally in order not to interfere with closing of the die.

The electrical arrangement is schematically shown in FIG. 4a. An ordinary 110 volt alternating current supply is rectified by a suitable rectifier. In the present case a full wave rectifier of the silicon diode or selenium or other suitable type is employed, and is schematically represented at 82. The rectified output is supplied to the magnet winding 36. A condenser 84 may be employed if desired. The switch 26 is shown located in the A.C. power supply, but it could also be located as shown at 86 in the D.C. supply.

The rectifiers may be located conveniently in either of two main places. In one construction I have located the rectifiers directly in the gauge body 30 in the corners outside the magnet coil. With this construction the line leading to the gauge is an A.C. line, and the switch is located as shown at 26 in FIG. 4a. In another construction I have located the rectifiers in the switch box, which ordinarily is separate from the gauge body because it is preferred to locate the switch in a convenient location at the side or front of the press, instead of on the gauge block itself, although the latter switch location also is possible, but not desirable.

As so far described the power press is assumed to perform only a single operation on the sheet. However, in many cases the press performs two immediately successive operations, and this requires two different gauge positions. For this purpose four gauges instead of two are commonly employed. Two of these are shown in perspective in FIG. 12 of the drawing. The gauge 90 carries a stop finger 92, and the gauge 94 carries a stop finger 96. In the present case finger 92 is the first stop and is disposed horizontally because it is assumed to overlie the die. After the initial bend the sheet is then moved in further over stop 92 until it reaches the second stop finger 96 which is disposed vertically, whereupon the sheet is again and further bent. It will be understood that there is another pair of gauges like the gauges 90 and 94 spaced sideward therefrom, so that the leading edge of the sheet will be stopped at two spaced points.

A flexible supply cord 98 extends from gauge 94, and another flexible supply cord 100 extends from gauge 90. Similar supply cords 102 and 104 extend from the other two gauges, and all are preferably detachably plugged into a common switch box 106 carrying four switches, 108, 110, 112 and 114, for independently energizing their respective gauges. Another detachable supply cord 116 brings power to the switch box 106.

Here again, it will be understood that the rectifiers may be located in the individual gauges, or in the switch box 106. The first arrangement is schematically shown in FIG. 10, in which supply cord 116 leads to switch box 106 carrying the four switches leading to sockets, which in turn, detachably receive the four supply cords 98, 100, 102 and 104 leading to four gauges, each with its own rectifiers.

The other arrangement is illustrated in FIG. 11 in which supply cord 116' leads to a switch box 106' containing a rectifier 120 of sufficient capacity to supply all four gauges. The four switches then are in the D.C. circuit, and the detachable cords 98', 100', 102' and 104' carry D.C. to the four gauges.

In some cases two gauge stops or stop fingers may be provided on a single gauge body. This is illustrated by the fragmentary perspective view shown in FIG. 9, in which a first stop finger 122 is disposed horizontally beneath the block 48 of the yoke, while a second stop finger 124 is disposed vertically on one side of the yoke. This arrangement is not as convenient as that previously described because the location of the gauge and any subsequent vernier adjustment of the gauge applies equally to both stop fingers, and the difference in position of the stop fingers is established by the lengths of the stop fingers. For most purposes, therefore, it is preferred to employ separate gauges instead of the combined mounting shown in FIG. 9.

In the particular gauge here illustrated the gauge body is approximately four inches wide, four inches high and six inches long. The gauge post is six inches long, so that the minimum overall height of the gauge is six inches. The large ferrous plate or table therefore is set at least six inches below the height of the top of the die, and it preferably is more than this in order to allow for dies of different height. Such changes in height are readily accommodated by raising the post, and for this purpose the cap screw 42 may be loosened, the post height adjusted, and the screw again tightened. If for some reason it is found necessary to place the stop finger at a lower height, this may be done by inverting the post so that the stop finger is carried beneath the part 38 instead of above the top of the gauge body.

In the specific gauge here described the coil has 8000 turns of No. 30 copper wire. It is a round coil on a round core having a diameter of 1¾ inch, but it will be understood that it could be a square coil on a square core, particularly when the rectifiers are located in the switch box. The rectifiers are of the silicon diode type housed in tubes ½ inch in diameter, located in the corners of the gauge body outside the coil. It will be understood that when a D.C. power supply is available, the rectifiers are not needed.

The foregoing specific dimensions and data are given solely by way of one example of the invention, and are not intended to be in limitation of the invention.

It is believed that the construction and method of use of our improved gauge device for power presses, as well as the advantages thereof, will be apparent from the foregoing detailed description. The gauge position is instantly released, and again instantly locked, and the position of one gauge may be kept locked while another is freed for adjustment. Adjustment may be made over a wide movement, say from ten to 50 inches apart from side-to-side (or even more when the press is wider because the ferrous table is made as wide as the press). The fore and aft adjustment is limited only by the fore and aft dimension of the table. A change in position may be made with speed and safety, and a large shift in position is made as quickly as a small one. This speed is important not only in saving cost of the men setting up the press, but also in reducing the "down time" during which the press is inoperative.

Vernier adjustment is readily made, either by measurement, or by trial and error, and both the rough adjustment and the vernier adjustment may be made with safety from the front of the press by means of a long wrench of simple conventional type. The stop finger and its adjustment are protected against shock and impact by a resilient mounting, and this serves to increase the maintained accuracy of the stop because it takes up any wear in the thread of the vernier adjusting screw. The magnetic action helps lock the adjusting screw.

It will be understood that while we have shown and described our invention in a preferred form, changes may be made without departing from the scope of the invention, as sought to be defined in the following claims.

We claim:

1. A gauge for use with a power press having a flat ferrous plate to support the gauge, said gauge being adapted to arrest the movement of sheet material through the press in order to properly position the same for an operation thereon by the press, said gauge comprising a body housing an electromagnet powerful enough to hold the gauge against movement on the plate when electrically energized, a vertically adjustable post carried by said body, a horizontally adjustable yoke carried by said post, and a stop finger secured to said yoke to be disposed in the path of the sheet material being operated on in the press, said yoke having a block and side guides straddling the post, and a horizontal adjusting screw passing through said block and post for horizontal adjustment of the yoke and finger relative to the post.

2. A gauge as defined in claim 1 in which the stop finger is a flat blade with one end acting as the stop surface, and in which the block of the yoke is provided with means to receive the stop finger with its flat surface in either vertical position, or in horizontal position.

3. A gauge for use with a press having a flat ferrous plate to support the gauge, said gauge comprising a body housing an electromagnet powerful enough to hold the gauge against movement on the plate when electrically energized, a vertically adjustable post carried by said body, a horizontally adjustable yoke carried by said post, and a finger secured to said yoke, said yoke having a block and side guides straddling the post, a screw passing through said block between said guides and threaded in said post, a compression spring around said screw between the block and post, and a dial on the head of said screw, said dial being calibrated for vernier adjustment of the yoke and finger.

4. A gauge system for a power press, said system comprising a flat ferrous plate disposed horizontally in back of the press, switch and rectifier means for use with a conventional A.C. supply, and a plurality of gauges on said plates adapted to arrest the movement of sheet material through the press in order to properly position the same for an operation thereon by the press, each gauge comprising a body housing an electromagnet powerful enough to hold the gauge against movement of the plate when energized by said A.C. power supply through said rectifier and switch means, a vertically adjustable post carried by said body, a horizontally adjustable yoke carried by said post, and a stop finger secured to said yoke to be disposed in the patch of the sheet material being operated on in the press, said yoke having a block and side guides straddling the post, and a horizontal adjusting screw passing through said block and post for horizontal adjustment of the yoke and finger relative to the post.

5. A system as defined in claim 4 in which the switch for each gauge is mounted on a switch box remote from the gauge, and in which the rectifier is housed in the switch box.

6. A gauge system as defined in claim 4 in which each gauge has a flexible power supply cord, and in which all of the switches are mounted on a single switch box having a plurality of sockets to receive the said supply cords, and in which a single additional power supply cord leads from the switch box to a suitable power supply receptacle.

7. A gauge system as defined in claim 4 in which the stop finger is a flat blade with one end acting as the stop surface, and in which the block of the yoke of each gauge is provided with means to receive the stop finger with its flat surface in either vertical position, or in horizontal position.

8. A gauge system for a press, said system comprising a flat ferrous plate disposed horizontally in back of the press, switch and rectifier means for use with a conventional A.C. power supply, and a plurality of gauges, on said plate, each gauge comprising a body housing an electromagnet powerful enough to hold the gauge against movement on the plate when energized by said A.C. supply through said rectifier and switch means, a vertically adjustable post carried by said body, a horizontally adjustable yoke carried by said post, and a stop finger secured to said yoke, said yoke having a block and side guides straddling the post, a screw passing through said block between said guides and threaded in said post, a compression spring around said screw between the block and post, and a dial on the head of said screw, said dial being calibrated for vernier adjustment of the yoke and finger.

9. A gauge system for a power press, said system comprising a flat ferrous plate disposed horizontally being adapted to arrest the movement of sheet material through the press in order to properly position the same for an operation thereon by the press, said gauge in back of the press, and a plurality of gauges on said plate adapted to arrest the movement of sheet material through the press in order to properly position the same for an operation thereon by the press, each gauge comprising a body housing an electromagnet powerful enough to hold the gauge against movement on the plate when energized, a vertically adjustable post carried by said body, a horizontally adjustable yoke carried by said post, and a stop finger secured to said yoke to be disposed in the path of the sheet material being operated on in the press, said yoke having a block and side guides straddling the post, and a horizontal adjusting screw passing through said block and post for horizontal adjustment of the yoke and finger relative to the post.

10. A gauge system for a press, said system comprising a flat ferrous plate disposed horizontally in back of the press, and a plurality of gauges on said plate, each gauge comprising a body housing an electromagnet powerful enough to hold the gauge against movement on the plate when energized, a vertically adjustable post carried by said body, a horizontally adjustable yoke carried by said post, and a stop finger secured to said yoke, said yoke having a block and side guides straddling the post, a screw passing through said block between said guides and threaded in said post, a compression spring around said screw between the block and post, and a dial on the head of said screw, said dial being calibrated for vernier adjustment of the yoke and finger.

11. A gauge system for a power press, said system comprising a fixed flat ferrous plate disposed horizontally in back of the press, and a plurality of gauges on said plate, said gauges being spaced apart in a direction transverse to the direction of movement of the sheet material through the press and serving to arrest the movement of sheet material through the press and to properly position the same for an operation thereon by the press, each gauge comprising a body housing an electromagnet powerful enough, when energized, to hold the gauge against movement on the plate despite the impact of the moving sheet material, a vertically adjustable post carried by said body, and a horizontally adjustable stop finger carried by said post and disposed in the path of the sheet material being operated on in the press.

12. A gauge system as defined in claim 11 in which each gauge has a flexible power supply cord, and in which all of the switches are mounted on a single switch box having a plurality of sockets to receive the said supply cords, and in which a single additional power supply cord leads from the switch box to a suitable power supply receptacle.

13. A gauge system for a power press, said system comprising a fixed flat ferrous plate disposed horizontaly in back of the press, switch and rectifier means for use with a conventional A.C. power supply, and a plurality of gauges on said plate, said gauges being spaced apart in a direction transverse to the direction of movement of the sheet material through the press and serving to arrest the movement of sheet material through the press and to properly position the same for an operation thereon by the press, each gauge comprising a body housing an electromagnet powerful enough, when energized by said A.C. supply and rectifier means, to hold the gauge against movement on the plate despite the impact of the moving sheet material, a vertically adjustable post carried by said body, and a horizontally adjustable stop finger carried by said post and disposed in the path of the sheet material being operated on the press.

14. A system as defined in claim 13 in which the rectifier for each gauge is carried in the body housing the electromagnet of that gauge.

15. A system as defined in claim 13 in which the switch for each gauge is mounted on a switch box remote from the gauge and outside the press, and in which the rectifier is housed in the switch box.

16. A gauge for use with a power press having a fixed flat ferrous plate behind the press to support the gauge, said gauge serving to arrest the movement of sheet material through the press in order to properly position the same for an operation thereon by the press, said gauge comprising a body housing an electromagnet powerful enough, when electrically energized, to hold the gauge against movement on the plate despite the impact of the moving sheet material, a stop finger carried by said body and disposed in the path of the sheet material being operated on in the press, and resilient means disposed between said stop finger and said finger to cushion the impact of the moving sheet material on the stop finger.

17. A gauge as defined in claim 16 in which a rectifier is carried in the gauge body housing the electromagnet, for use with an A.C. supply.

18. A gauge as defined in claim 16 in which a switch for controlling the energization of the magnet from an A.C. supply is mounted on a switch box remote from the gauge and outside the press, in which a rectifier is housed in the switch box.

19. A gauge for use with a power press having a fixed flat ferrous plate behind the press to support the gauge, said gauge serving to arrest the movement of sheet material through the press in order to properly position the same for a operation thereon by the press, said gauge comprising a body housing an electromagnet powerful enough, when electrically energized, to hold the gauge against movement on the plate despite the impact of the moving sheet material, a stop finger carried by said body and disposed in the path of the sheet material being operated on in the press, and a lead screw disposed between said stop finger and said body for precision adjustment of the stop finger in horizontal direction relative to the body.

20. A gauge for use with a power press having a fixed flat ferrous plate behind the press to support the gauge, said gauge serving to arrest the movement of sheet material through the press in order to properly position the same for an operation thereon by the press, said gauge comprising a body housing an electromagnet powerful enough, when electrically energized, to hold the gauge against movement on the plate despite the impact of the moving sheet material, a stop finger carried by said body and disposed in the path of the sheet material being operated on in the press, a lead screw disposed between said stop finger and said body for precision adjustment on the stop finger in horizontal direction relative to the body, and a vernier dial on said lead screw to facilitate precision adjustment.

21. A gauge for use with a power press having a fixed flat ferrous plate behind the press to support the gauge, said gauge serving to arrest the movement of sheet material through the press in order to properly position the same for an operation thereon by the press, said gauge comprising a body housing an electromagnet powerful enough, when electrically energized, to hold the gauge against movement on the plate despite the impact of the moving sheet material, and a horizontal stop finger carried by said body and disposed in the path of the sheet material being operated on in the press, said stop finger including a relatively broad blade-like element having an end which is perpendicular to its long edges, said end acting as the stop surface of the stop finger.

22. A gauge system for a power press, said system comprising a fixed flat ferrous plate disposed horizontally in back of the press, and a plurality of gauges on said plate, said gauges being spaced apart in a direction transverse to the direction of movement of the sheet material through the press and serving to arrest the movement of heavy sheet material through the press and to properly position the same for an operation thereon by the press, each gauge comprising a body housing an electromagnet powerful enough, when energized, to hold the gauge against movement on the plate despite the impact of the moving sheet material, a stop finger carried by said body and disposed in the path of the sheet material being operated on in the press, and means for adjustment of the stop finger in horizontal direction relative to the body.

References Cited by the Examiner

UNITED STATES PATENTS

| | | | |
|---|---|---|---|
| 2,095,059 | 10/1937 | Donnelly | 33—169 |
| 2,219,370 | 10/1940 | Pierce. | |
| 2,337,248 | 12/1943 | Koller. | |
| 2,417,234 | 3/1947 | Calow. | |
| 2,429,387 | 10/1947 | Buchheim | 73—461 |
| 2,510,768 | 6/1950 | Williamson | 72—36 |
| 2,813,710 | 11/1957 | Angle | 266—23 |
| 2,814,123 | 11/1957 | Banks | 33—170 |
| 2,839,836 | 6/1958 | Fuller | 33—174 |

LEONARD FOREMAN, *Primary Examiner.*

ISAAC LISANN, SAMUEL S. MATTHEWS, LOUIS R. PRINCE, *Examiners.*